(12) United States Patent
Gladstone et al.

(10) Patent No.: US 10,597,137 B2
(45) Date of Patent: Mar. 24, 2020

(54) THERMAL INSULATORS HAVING COLD SIDE FLAP SEALS

(71) Applicant: The Boeing Company, Chicago, IL (US)

(72) Inventors: Brooke Gladstone, Ladson, SC (US); Thomas Dean, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 15/721,289

(22) Filed: Sep. 29, 2017

(65) Prior Publication Data

US 2019/0100298 A1    Apr. 4, 2019

(51) Int. Cl.
| | |
|---|---|
| *B64C 1/40* | (2006.01) |
| *B60R 13/08* | (2006.01) |
| *F16L 59/02* | (2006.01) |
| *E04B 1/80* | (2006.01) |

(52) U.S. Cl.
CPC .......... *B64C 1/40* (2013.01); *B60R 13/0838* (2013.01); *F16L 59/026* (2013.01); *F16L 59/028* (2013.01); *E04B 1/80* (2013.01); *Y10T 428/195* (2015.01)

(58) Field of Classification Search
CPC ............ Y10T 428/195; B60R 13/0838; B60R 13/0876; B60R 13/0884; B64C 1/40; F16L 59/026; F16L 59/028
See application file for complete search history.

(56) References Cited

U.S. PATENT DOCUMENTS

2006/0019568 A1 *  1/2006  Toas .......................... E04B 1/80
                                                                        442/381

* cited by examiner

*Primary Examiner* — Alexander S Thomas
(74) *Attorney, Agent, or Firm* — Hanley, Flight & Zimmerman, LLC

(57) ABSTRACT

Thermal insulators having cold side flap seals are described. An example thermal insulator includes a first thermal blanket and a second thermal blanket to be coupled to the first thermal blanket. The first thermal blanket includes a first insulation section, a flap, and a second insulation section. The flap extends laterally from the first insulation section and has a first portion laterally adjacent the first insulation section and a second portion laterally adjacent the first portion. The second insulation section is located on the first portion. The second thermal blanket includes a third insulation section, a fourth insulation section, and a seal. The fourth insulation section has a third portion laterally adjacent the third insulation section and a fourth portion laterally adjacent the third portion. The seal is to be compressed between the third portion and the second portion when the second thermal blanket is coupled to the first thermal blanket.

20 Claims, 6 Drawing Sheets

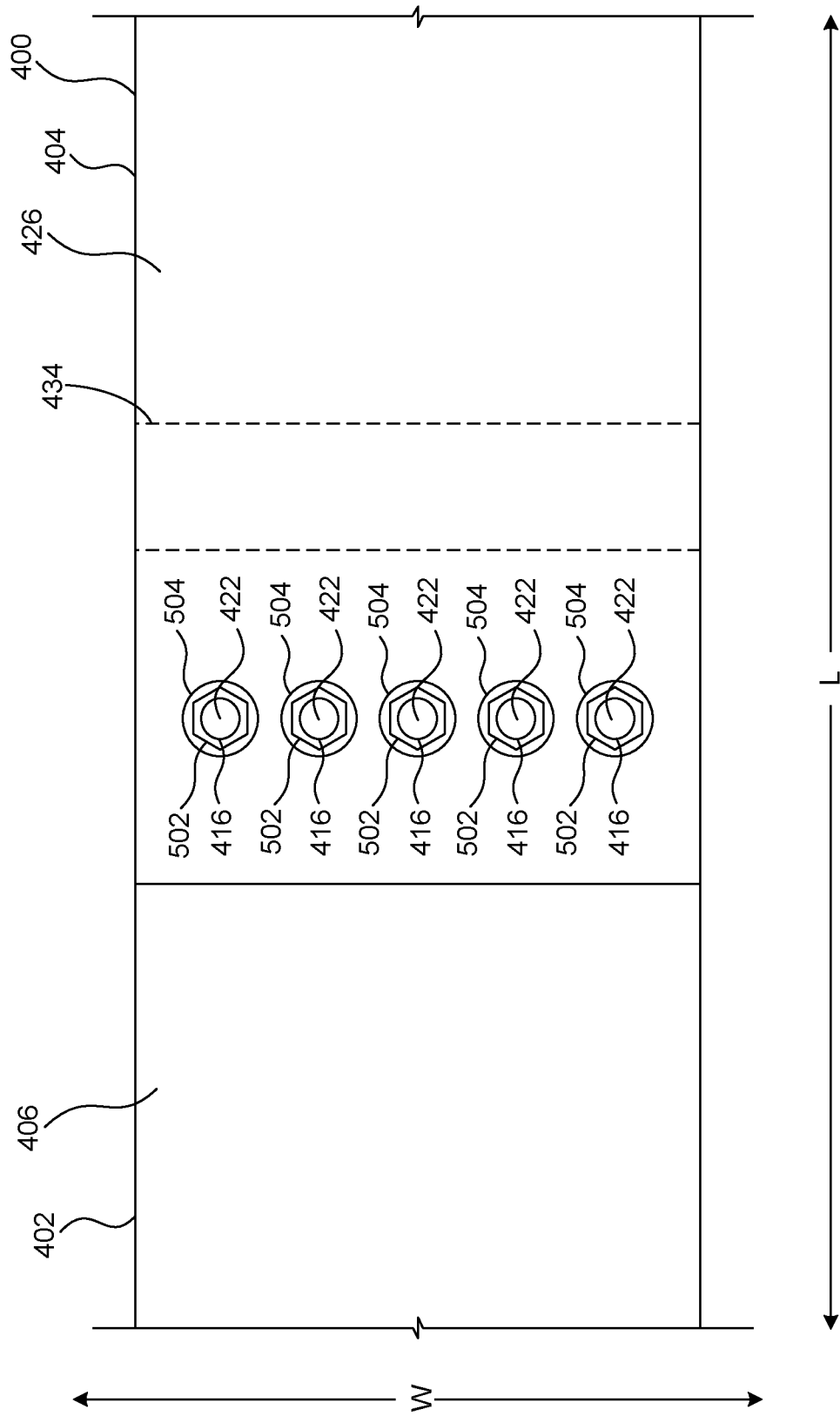

THERMAL INSULATORS HAVING COLD SIDE FLAP SEALS

FIELD OF THE DISCLOSURE

This disclosure relates generally to thermal insulators and, more specifically, to thermal insulators having cold side flap seals.

BACKGROUND

Thermal protection is implemented in a variety of aircraft systems, including in and/or on structures of aircraft engines (e.g., commercial aircraft engines) where high temperatures are generated and/or emitted as a result of combustion processes occurring in the cores of the engines. For example, a thermal protection system may be implemented between a core of an aircraft engine and a thrust reverser of the aircraft engine to protect the thrust reverser from heat emitted from the core. Conventional thermal protection systems for aircraft engines include the application of blankets of thermal insulation that are joined together at respective overlapping portions thereof.

SUMMARY

Thermal insulators having cold side flap seals are disclosed herein. In some examples, a thermal insulator is disclosed. In some disclosed examples, the thermal insulator comprises a first thermal blanket and a second thermal blanket to be coupled to the first thermal blanket. In some disclosed examples, the first thermal blanket includes a first insulation section, a flap, and a second insulation section. In some disclosed examples, the flap extends laterally from the first insulation section and has a first portion laterally adjacent the first insulation section and a second portion laterally adjacent the first portion. In some disclosed examples, the second insulation section is located on the first portion of the flap. In some disclosed examples, the second thermal blanket includes a third insulation section, a fourth insulation section, and a seal. In some disclosed examples, the fourth insulation section has a third portion laterally adjacent the third insulation section and a fourth portion laterally adjacent the third portion. In some disclosed examples, the seal is to be compressed between the third portion of the fourth insulation section and the second portion of the flap when the second thermal blanket is coupled to the first thermal blanket.

In some disclosed examples, a thermal insulator comprises a first thermal blanket and a second thermal blanket to be coupled to the first thermal blanket. In some disclosed examples, the first thermal blanket includes a first hot side face sheet, a first cold side face sheet, a first insulation section, a flap, and a second insulation section. In some disclosed examples, the first insulation section is located between the first hot side face sheet and the first cold side face sheet. In some disclosed examples, the flap is located between the first hot side face sheet and the first cold side face sheet adjacent the first cold side face sheet. In some disclosed examples, the flap extends laterally from the first insulation section and has a first portion laterally adjacent the first insulation section and a second portion laterally adjacent the first portion. In some disclosed examples, the second insulation section is located between the first hot side face sheet and the first cold side face sheet on the first portion of the flap. In some disclosed examples, the second thermal blanket includes a second hot side face sheet, a second cold side face sheet, a third insulation section, a fourth insulation section, and a seal. In some disclosed examples, the third insulation section is located between the second hot side face sheet and the second cold side face sheet. In some disclosed examples, the fourth insulation section is located between the second hot side face sheet and the second cold side face sheet. In some disclosed examples, the fourth insulation section has a third portion laterally adjacent the third insulation section and a fourth portion laterally adjacent the third portion. In some disclosed examples, the seal is coupled to the second cold side face sheet and located on the third portion of the fourth insulation section. In some disclosed examples, the seal is to be compressed between the third portion of the fourth insulation section and the second portion of the flap when the second thermal blanket is coupled to the first thermal blanket.

BRIEF DESCRIPTION OF THE DRAWINGS

FIG. 6 is a plan view of the example thermal insulator of FIG. 5 taken from the hot side of the thermal insulator.

Figure 1:
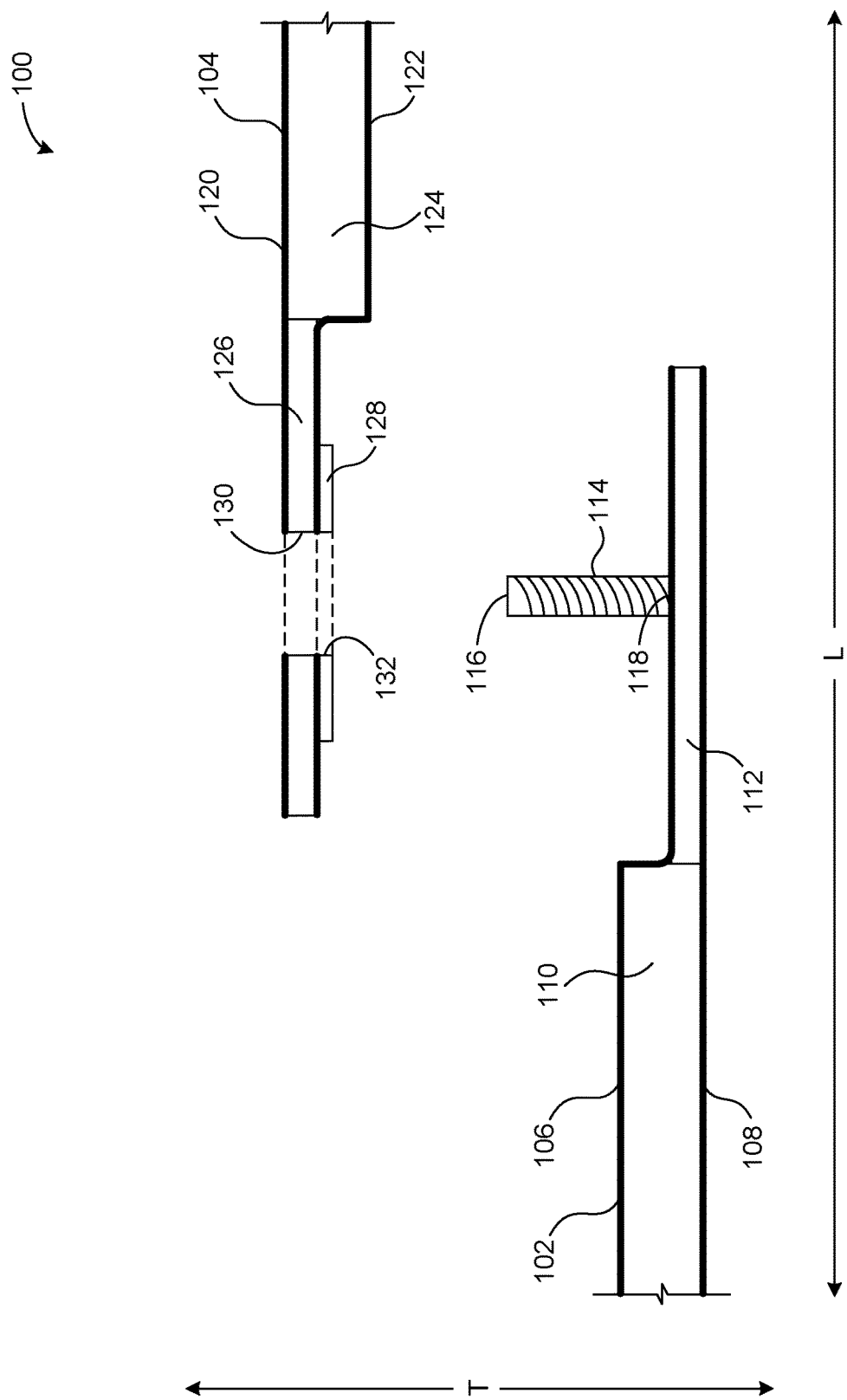
FIG. 1 is an exploded cross-sectional view illustrating a known thermal insulator having a first thermal blanket and a second thermal blanket to be coupled to the first thermal blanket.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Conventional thermal protection systems for aircraft engines include the application of blankets of thermal insulation that are fastened and/or joined together at respective overlapping portions thereof. For example, two adjoining blankets of thermal insulation may be fastened together by a threaded stud coupled to a first insulation portion of a first one of the blankets, a through hole formed in a second insulation portion of a second one of the blankets and configured to receive the threaded stud, and a threaded nut placed over the threaded stud to form a threaded connection that secures the first insulation portion of the first one of the blankets to the second insulation portion of the second one of the blankets.

Such conventional thermal protection systems commonly include a thermal seal located between the first insulation portion of the first blanket and the second insulation portion of the second blanket, and positioned in line with the above-described fastening mechanism such that the threaded stud passes through the thermal seal. The thermal seal is intended to reduce and/or prevent air flow through the joint formed between the coupled thermal blankets. Positioning the thermal seal in the above-described location, however, has several drawbacks and/or disadvantages.

For example, when positioned between the first insulation portion of the first blanket and the second insulation portion of the second blanket, the thermal seal is exposed to an average of the hot side and cold side temperatures of the adjoined blankets. The thermal seal may accordingly be exposed to undesirably high temperatures that cause the thermal seal to age more quickly and/or experience a loss of durability over the life of the aircraft. As a result, the thermal seal may be prevented from reaching its full sealing potential, and may need to be replaced.

As another example drawback, positioning the thermal seal between the first insulation portion of the first blanket and the second insulation portion of the second blanket in line with the above-described fastening mechanism may result in a preload applied to the fastening mechanism being lost when the thermal seal takes a compression set. Loss of preload applied to the fastening mechanism loosens the joint formed between the first blanket and the second blanket and increases the risk that hot air will leak past the thermal seal and effect the structure (e.g., a thrust reverser) that is to be protected by the thermal protection system.

Unlike the conventional thermal protection systems described above, the thermal protection systems and/or thermal insulators disclosed herein advantageously include cold side flap seals having a flap located adjacent (e.g., abutting and/or contacting) the cold side of the thermal insulator, and a seal to be compressed against the flap and laterally offset from a fastening mechanism of the thermal insulator. Locating and/or positioning the thermal seal adjacent the cold side flap of the thermal insulator advantageously reduces (e.g., minimizes) the possibility of the thermal seal being exposed to undesirably high temperatures, and causes the thermal seal to assume the cold side temperature of the thermal insulator. As a result, the thermal seal ages less quickly, and is less susceptible to experiencing a loss of durability over the life of the aircraft. The thermal seal is accordingly more likely to reach its full sealing potential and intended lifespan. Furthermore, laterally offsetting the thermal seal relative to the fastening mechanism of the thermal insulator advantageously reduces (e.g., minimizes or eliminates) any risk of losing preload applied to the fastening mechanism, and accordingly reduces any possibility that hot air will leak past the thermal seal and effect the structure that is to be protected by the thermal protection system and/or thermal insulator. Before describing the details of the disclosed thermal protection systems and/or thermal insulators having cold side flap seals, a description of a conventional, known thermal insulator is provided in connection with FIGS. 1-3.

Figure 2:
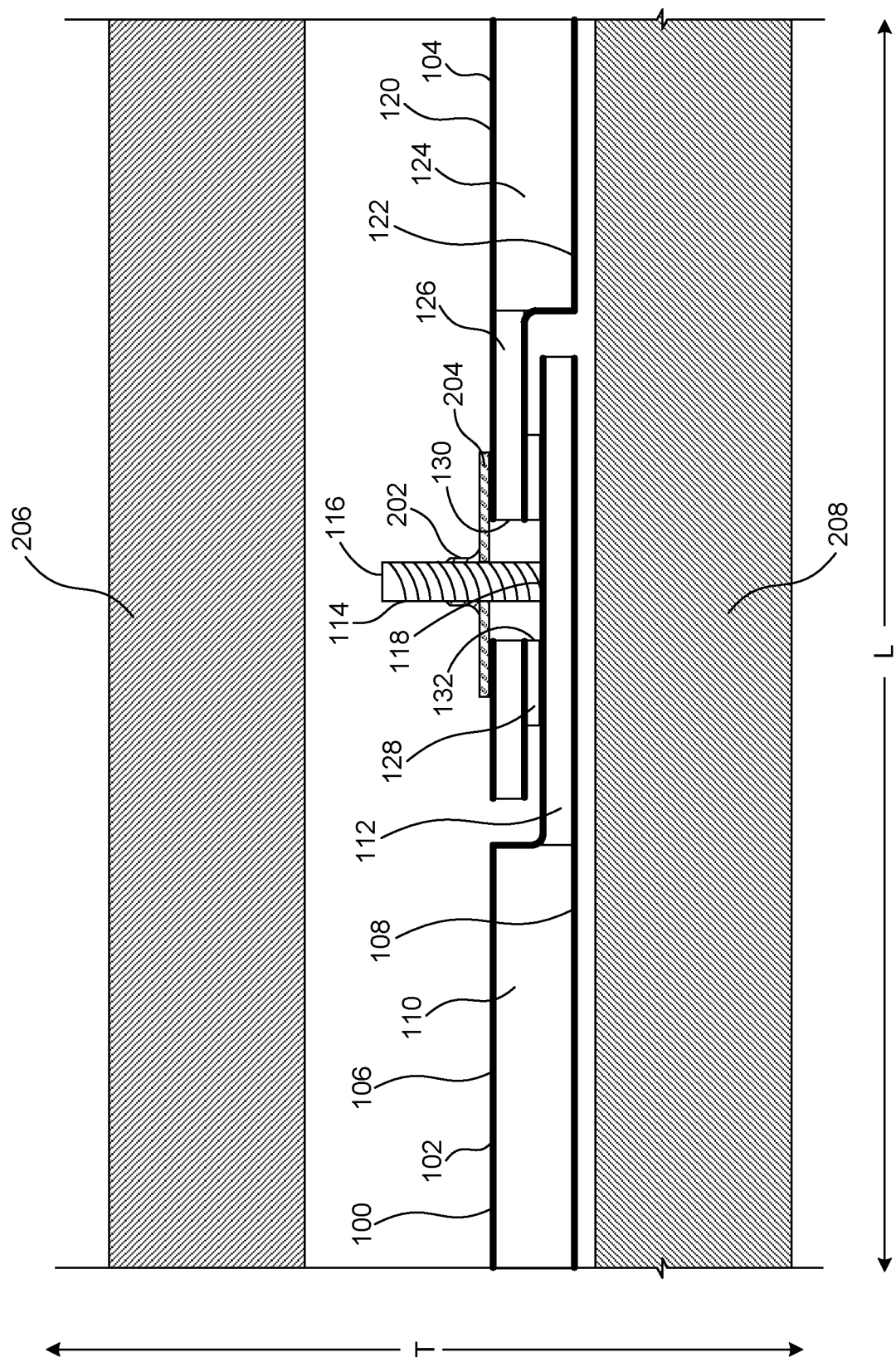
FIG. 2 is a cross-sectional view illustrating the known thermal insulator of FIG. 1 with the second thermal blanket of FIG. 1 coupled to the first thermal blanket of FIG. 1.
Figure 3:
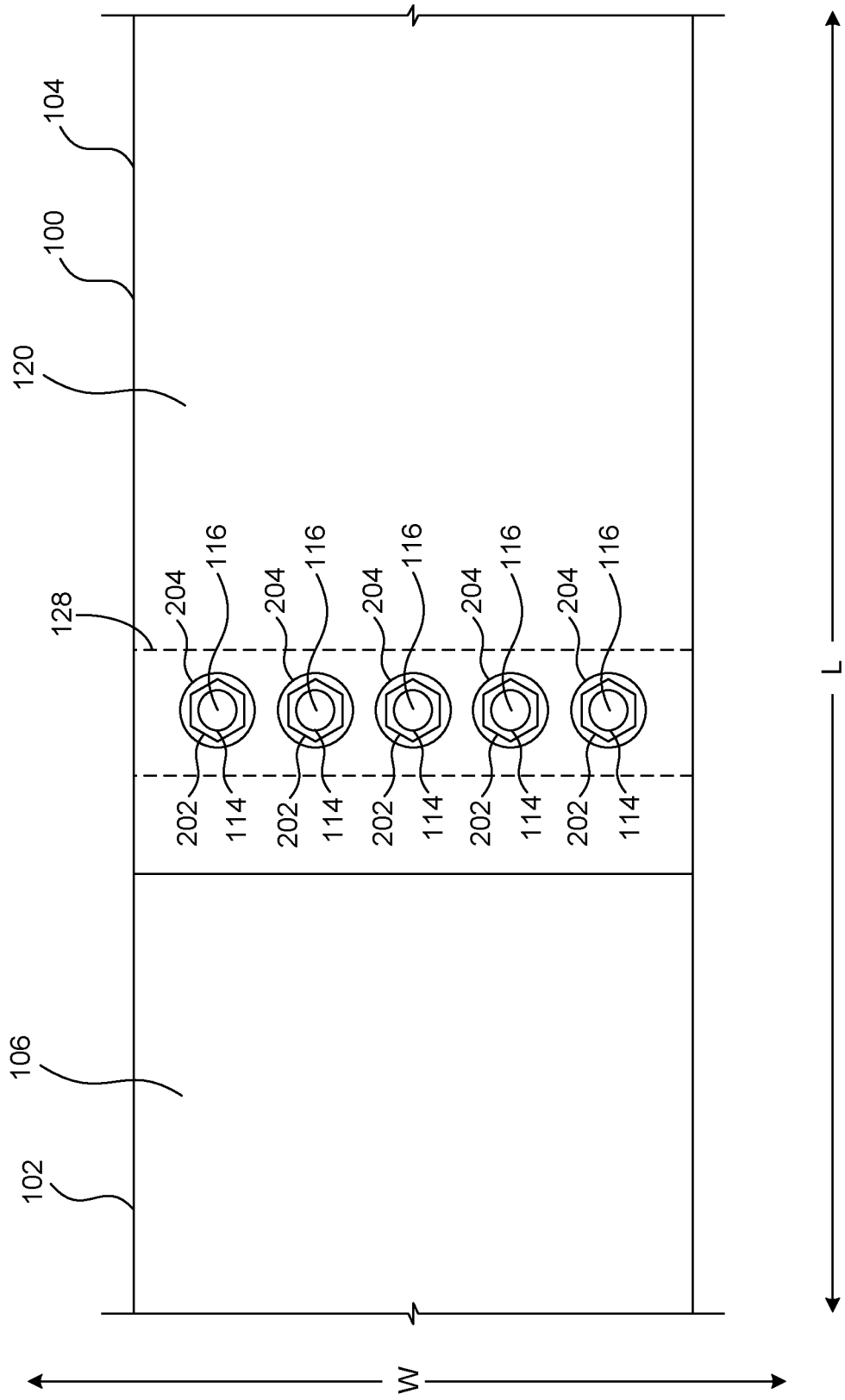
FIG. 3 is a plan view of the known thermal insulator of FIG. 2 taken from the hot side of the thermal insulator.

FIG. 1 is an exploded cross-sectional view illustrating a known thermal insulator 100 having a first thermal blanket 102 and a second thermal blanket 104 to be coupled to the first thermal blanket 102. FIG. 2 is a cross-sectional view illustrating the known thermal insulator 100 of FIG. 1 with the second thermal blanket 104 of FIG. 1 coupled to the first thermal blanket 102 of FIG. 1. FIG. 3 is a plan view of the known thermal insulator 100 of FIG. 2 taken from the hot side of the thermal insulator 100. The first thermal blanket 102 and the second thermal blanket 104 of FIGS. 1-3 have respective example lengths along a lateral direction (indicated as "L" is FIGS. 1-3), respective example widths (indicated as the dimension "W" in FIG. 3), and respective example thicknesses (indicated as the dimension "T" in FIGS. 1 and 2).

As shown in FIGS. 1-3, the first thermal blanket 102 of the known thermal insulator 100 includes a first hot side face sheet 106, a first cold side face sheet 108, a first insulation section 110, a second insulation section 112, and a fastener 114. The first insulation section 110 of FIGS. 1-3 is located and extends between the first hot side face sheet 106 and the first cold side face sheet 108 of FIGS. 1-3. The second insulation section 112 of FIGS. 1-3 is also located and extends between the first hot side face sheet 106 and the first cold side face sheet 108 of FIGS. 1-3 laterally adjacent (e.g., abutting and/or contacting along the lateral direction "L" shown in FIGS. 1-3) the first insulation section 110 of FIGS. 1-3.

The fastener 114 of the first thermal blanket 102 of FIGS. 1-3 has a free end 116 and a fixed end 118 opposite the free end 116. The free end 116 of the fastener 114 of FIGS. 1-3 extends from the second insulation section 112 of FIGS. 1-3 in a direction away from the first cold side face sheet 108 of FIGS. 1-3. The free end 116 of the fastener 114 of FIGS. 1-3 is externally threaded to form a threaded connection with an internally threaded retaining nut (e.g., the retaining nut 202 of FIG. 2 described below) to be placed over the free end 116 of the fastener 114. As shown in FIGS. 1-3, the fixed end 118 of the fastener 114 is coupled (e.g., welded, bonded, or otherwise joined) to the first hot side face sheet 106 of the first thermal blanket 102. As shown in FIG. 3, the first thermal blanket 102 includes multiple ones of the fastener 114 arranged in a crosswise direction along the second insulation section 112.

As shown in FIGS. 1-3, the second thermal blanket 104 of the known thermal insulator 100 includes a second hot side face sheet 120, a second cold side face sheet 122, a third insulation section 124, a fourth insulation section 126, and a seal 128. The third insulation section 124 of FIGS. 1-3 is located and extends between the second hot side face sheet 120 and the second cold side face sheet 122 of FIGS. 1-3. The fourth insulation section 126 of FIGS. 1-3 is also located and extends between the second hot side face sheet 120 and the second cold side face sheet 122 of FIGS. 1-3. The seal 128 of FIGS. 1-3 is coupled (e.g., bonded, adhered, or otherwise joined) to the second cold side face sheet 122 of FIGS. 1-3 and located on the fourth insulation section 126 of FIGS. 1-3. The seal 128 of FIGS. 1-3 is formed of a heat-resistant, elastomeric material and is to be compressed between the fourth insulation section 126 of FIGS. 1-3 and the second insulation section 112 of FIGS. 1-3 when the second thermal blanket 104 of FIGS. 1-3 is coupled to the first thermal blanket 102 of FIGS. 1-3.

As shown in FIGS. 1-3, a first through hole 130 is formed in the fourth insulation section 126 of FIGS. 1-3, and a second through hole 132 is formed in the seal 128 of FIGS. 1-3. The first through hole 130 extends through the second hot side face sheet 120, the fourth insulation section 126, and the second cold side face sheet 122 of the second thermal blanket 104 of FIGS. 1-3. The second through hole 132 is aligned with the first through hole 130. The first through hole 130 and the second through hole 132 of FIGS. 1-3 are to receive the free end 116 of the fastener 114 of FIGS. 1-3 to enable the second thermal blanket 104 of FIGS. 1-3 to be coupled to the first thermal blanket 102 of FIGS. 1-3. As shown in FIG. 2, a retaining nut 202 and an example retaining washer 204 are placed over the free end 116 of the fastener 114 on the second hot side face sheet 120 of the second thermal blanket 104 of FIGS. 1-3 to couple the second thermal blanket 104 to the first thermal blanket 102 of FIGS. 1-3. The retaining nut 202 of FIG. 2 is internally threaded to form a threaded connection with the externally threaded free end 116 of the fastener 114. As shown in FIG. 3, the second thermal blanket 104 includes multiple ones of the first through hole 130 (along with corresponding ones of the second through hole 132) arranged in a crosswise direction along the fourth insulation section 126, and corresponding in number to the multiple ones of the fastener 114 of the first thermal blanket 102.

As shown in FIG. 2, the hot side of the known thermal insulator 100 (e.g., the first hot side face sheet 106 of the first thermal blanket 102 and the second hot side face sheet 120 of the second thermal blanket 104) faces a heat-generating structure 206, and the cold side of the known thermal insulator 100 (e.g., the first cold side face sheet 108 of the first thermal blanket 102 and the second cold side face sheet 122 of the second thermal blanket 104) faces a thermally-protected structure 208. The heat-generating structure 206 of FIG. 2 may be an engine core of an aircraft engine, and the thermally-protected structure 208 of FIG. 2 may be a thrust reverser of the aircraft engine.

Figure 4:
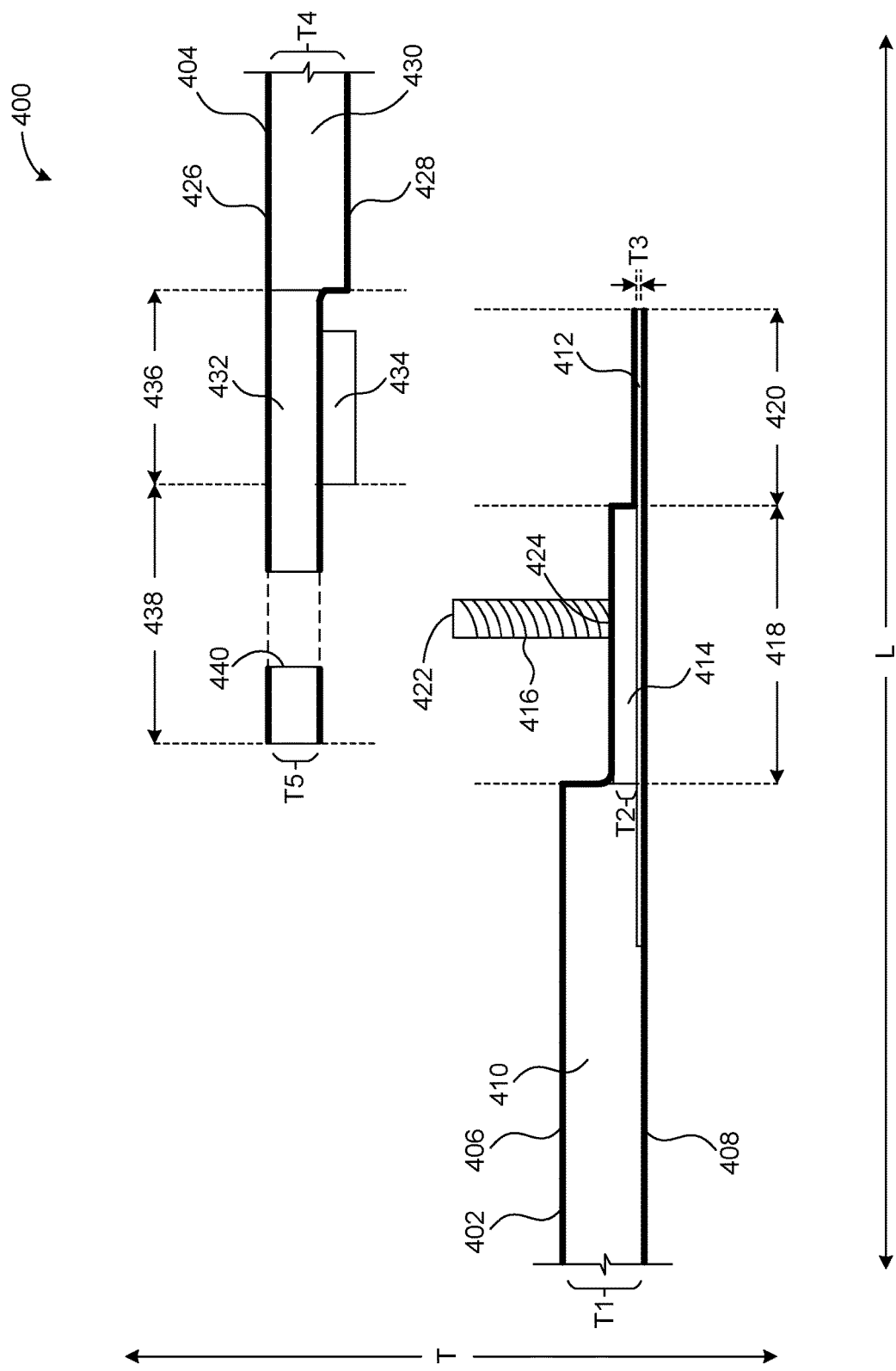
FIG. 4 is an exploded cross-sectional view illustrating an example thermal insulator having a first example thermal blanket and a second example thermal blanket to be coupled to the first thermal blanket in accordance the with teachings of this disclosure.
Figure 5:
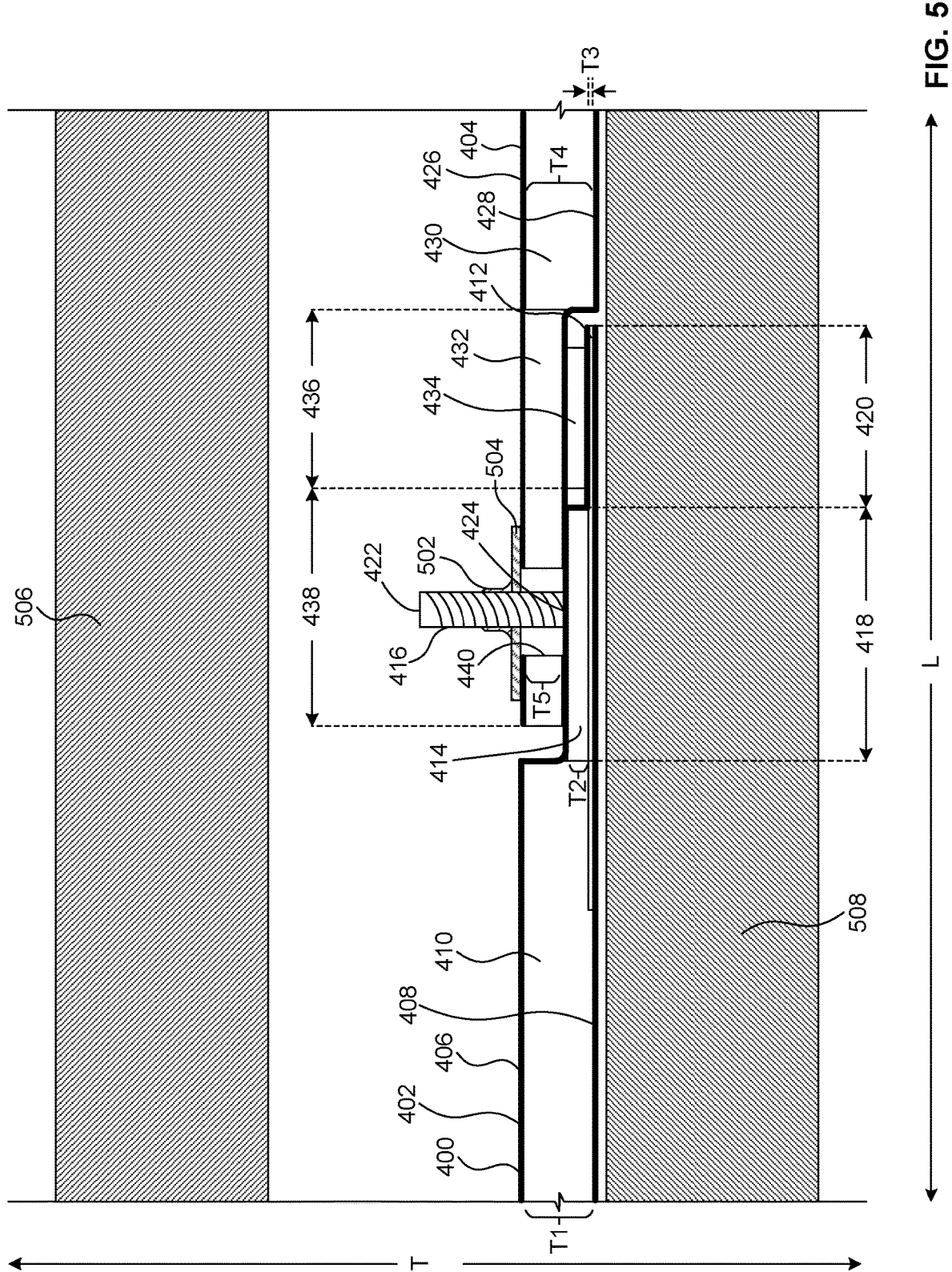
FIG. 5 is a cross-sectional view illustrating the example thermal insulator of FIG. 4 with the second example thermal blanket of FIG. 4 coupled to the first example thermal blanket of FIG. 4.

FIG. 4 is an exploded cross-sectional view illustrating an example thermal insulator 400 having a first example thermal blanket 402 and a second example thermal blanket 404 to be coupled to the first thermal blanket 402 in accordance the with teachings of this disclosure. FIG. 5 is a cross-sectional view illustrating the example thermal insulator 400 of FIG. 4 with the second example thermal blanket 404 of FIG. 4 coupled to the first example thermal blanket 402 of FIG. 4. FIG. 6 is a plan view of the example thermal insulator 400 of FIG. 5 taken from the hot side of the thermal insulator 400.

The first thermal blanket 402 and the second thermal blanket 404 of FIGS. 4-6 have respective example lengths along a lateral direction (indicated as "L" is FIGS. 4-6), respective example widths (indicated as the dimension "W" in FIG. 6), and respective example thicknesses (indicated as the dimension "T" in FIGS. 4 and 5). The first thermal blanket 402, the second thermal blanket 404, and/or, more generally, the thermal insulator 400 of FIGS. 4-6 may be of any size and/or shape, including the size(s) and shapes(s) illustrated in connection with FIGS. 4-6.

In the illustrated example of FIGS. 4-6, the first thermal blanket 402 of the thermal insulator 400 includes a first example hot side face sheet 406, a first example cold side face sheet 408, a first example insulation section 410, an example flange and/or flap 412, a second example insulation section 414, and an example fastener 416. The first insulation section 410 of FIGS. 4-6 is located and extends between the first hot side face sheet 406 and the first cold side face sheet 408 of FIGS. 4-6. The flap 412 of FIGS. 4-6 is located between the first hot side face sheet 406 and the first cold side face sheet 408 of FIGS. 4-6 adjacent (e.g., abutting and/or contacting) the first cold side face sheet 408. In the illustrated example of FIGS. 4-6, the flap 412 extends laterally (e.g., extending along the lateral direction "L" shown in FIGS. 4-6) from the first insulation section 410 of FIGS. 4-6 and has a first example portion 418 laterally adjacent (e.g., abutting and/or contacting along the lateral direction "L") the first insulation section 410 and a second example portion 420 laterally adjacent the first portion 418. The second insulation section 414 of FIGS. 4-6 is located and extends between the first hot side face sheet 406 and the flap 412 of FIGS. 4-6 on the first portion 418 of the flap 412 of FIGS. 4-6.

The fastener 416 of the first thermal blanket 402 of FIGS. 4-6 has an example free end 422 and an example fixed end 424 opposite the free end 422. The free end 422 of the fastener 416 of FIGS. 4-6 extends from the second insulation section 414 of FIGS. 4-6 in a direction away from the flap 412 of FIGS. 4-6. In some examples, the fastener 416 of FIGS. 4-6 may be implemented as a stud, a post, or a bolt. In some examples, the free end 422 of the fastener 416 of FIGS. 4-6 is externally threaded to form a threaded connection with an internally threaded retaining nut (e.g., the retaining nut 502 of FIG. 5 described below) to be placed over the free end 422 of the fastener 416. In the illustrated example of FIGS. 4-6, the fixed end 424 of the fastener 416 is coupled (e.g., welded, bonded, or otherwise joined) to the first hot side face sheet 406 of the first thermal blanket 402. In other examples, the fixed end 424 of the fastener 416 of FIGS. 4-6 may instead be coupled (e.g., welded, bonded, or otherwise joined) to the first cold side face sheet 408 of the first thermal blanket 402 of FIGS. 4-6. In some such other examples, the fastener 416 of FIGS. 4-6 passes through the first portion 418 of the flap 412 of FIGS. 4-6 and through the second insulation section 414 of FIGS. 4-6. As shown in FIG. 6, the first thermal blanket 402 may include multiple ones of the fastener 416 arranged in a crosswise direction along the second insulation section 414.

In the illustrated example of FIGS. 4-6, the second thermal blanket 404 of the thermal insulator 400 includes a second example hot side face sheet 426, a second example cold side face sheet 428, a third example insulation section 430, a fourth example insulation section 432, and an example seal 434. The third insulation section 430 of FIGS. 4-6 is located and extends between the second hot side face sheet 426 and the second cold side face sheet 428 of FIGS. 4-6. The fourth insulation section 432 of FIGS. 4-6 is also located and extends between the second hot side face sheet 426 and the second cold side face sheet 428 of FIGS. 4-6.

In the illustrated example of FIGS. 4-6, the fourth insulation section 432 has a third example portion 436 laterally adjacent (e.g., abutting and/or contacting along the lateral direction "L") the third insulation section 430 of FIGS. 4-6 and a fourth example portion 438 laterally adjacent the third portion 436. The seal 434 of FIGS. 4-6 is coupled (e.g., bonded, adhered, or otherwise joined) to the second cold side face sheet 428 of FIGS. 4-6 and located on the third portion 436 of the fourth insulation section 432 of FIGS. 4-6. The seal 434 of FIGS. 4-6 is formed of a heat-resistant, elastomeric material and is to be compressed between the third portion 436 of the fourth insulation section 432 of FIGS. 4-6 and the second portion 420 of the flap 412 of FIGS. 4-6 when the second thermal blanket 404 of FIGS. 4-6 is coupled to the first thermal blanket 402 of FIGS. 4-6. In some examples, the seal 434 of FIGS. 4-6 is compressible to at least twenty percent (20%) of the uncompressed thickness of the seal 434. In some examples, the seal 434 of FIGS. 4-6 is compressible to fifty percent (50%) of the uncompressed thickness of the seal 434. In some examples, the seal 434 of FIGS. 4-6 is capable of withstanding a pressure differential of at least 0.2 pounds per square inch. In some examples, the seal 434 of FIGS. 4-6 is capable of withstanding a pressure differential of approximately 2.0 pounds per square inch.

In the illustrated example of FIGS. 4-6, an example through hole 440 is formed in the fourth portion 438 of the fourth insulation section 432 of FIGS. 4-6. The through hole 440 extends through the second hot side face sheet 426, the fourth portion 438 of the fourth insulation section 432, and the second cold side face sheet 428 of the second thermal blanket 404 of FIGS. 4-6. The through hole 440 of FIGS. 4-6 is to receive the free end 422 of the fastener 416 of FIGS. 4-6 to enable the second thermal blanket 404 of FIGS. 4-6 to be coupled to the first thermal blanket 402 of FIGS. 4-6. As shown in FIG. 5, the example retaining nut 502 and an example retaining washer 504 are placed over the free end 422 of the fastener 416 on the second hot side face sheet 426 of the second thermal blanket 404 of FIGS. 4-6 to couple the second thermal blanket 404 to the first thermal blanket 402 of FIGS. 4-6. In some examples, the retaining nut 502 of FIG. 5 is internally threaded to form a threaded connection with the externally threaded free end 422 of the fastener 416. As shown in FIG. 6, the second thermal blanket 404 may include multiple ones of the through hole 440 arranged in a crosswise direction along the fourth portion 438 of the fourth insulation section 432, and corresponding in number to the multiple ones of the fastener 416 of the first thermal blanket 102.

The first insulation section 410, the second insulation section 414, the flap 412, the third insulation section 430, and the fourth insulation section 432 of FIGS. 4-6 have corresponding thicknesses along the direction "T" shown in FIGS. 4 and 5. For example, as shown in FIGS. 4 and 5, the first insulation section 410 has a first thickness (T1), the second insulation section 414 has a second thickness (T2) less than the first thickness (T1), the flap 412 has a third thickness (T3) less than the second thickness (T2), the third insulation section 430 has a fourth thickness (T4) approximately equal to the first thickness (T1), and the fourth insulation section 432 has a fifth thickness (T5) less than the fourth thickness (T4). In the illustrated example of FIGS. 4-6, the second thickness (T2) is approximately one-third of the first thickness (T1), and the fifth thickness (T5) is approximately two-thirds of the fourth thickness (T4). For example, the first thickness (T1) of the first insulation section 410 of FIGS. 4 and 5 is approximately 0.375 inches, the second thickness (T2) of the second insulation section 414 of FIGS. 4 and 5 is approximately 0.125 inches, the third thickness (T3) of the flap 412 of FIGS. 4 and 5 is approximately 0.020 inches, the fourth thickness (T4) of the third insulation section 430 of FIGS. 4 and 5 is approximately 0.375 inches, and the fifth thickness (T5) of the fourth insulation section 432 of FIGS. 4 and 5 is approximately 0.250 inches.

In some examples, the seal 434 of FIGS. 4 and 5 has an uncompressed thickness of approximately one-half of the fourth thickness (T4) of the third insulation section 430 of FIGS. 4 and 5, and a compressed thickness approximately equal to the second thickness (T2) of the second insulation section 414 of FIGS. 4 and 5. For example, the uncompressed thickness of the seal 434 of FIGS. 4 and 5 may be approximately 0.1875 inches, and the compressed thickness of the seal 434 of FIGS. 4 and 5 may be approximately 0.125 inches.

In the illustrated example of FIG. 5, the hot side of the thermal insulator 400 (e.g., the first hot side face sheet 406 of the first thermal blanket 402 and the second hot side face sheet 426 of the second thermal blanket 404) faces an example heat-generating structure 506, and the cold side of the thermal insulator 400 (e.g., the first cold side face sheet 408 of the first thermal blanket 402 and the second cold side face sheet 428 of the second thermal blanket 404) faces an example thermally-protected structure 508. In some examples, the heat-generating structure 506 of FIG. 5 may be an engine core of an aircraft engine, and the thermally-protected structure 508 of FIG. 5 may be a thrust reverser of the aircraft engine.

In the illustrated example of FIGS. 4-6, the first hot side face sheet 406 and the second hot side face sheet 426 are respectively formed from corrosion resistant steel (CRES). The first cold side face sheet 408 and the second cold side face sheet 428 of FIGS. 4-6 are respectively formed from polyimide film such as Kapton®. The first insulation section 410 and the third insulation section 430 of FIGS. 4-6 are respectively formed from a microporous silica packed powder ceramic insulation encapsulated in fiberglass fabric having a density of approximately eight pounds per cubic foot. The second insulation section 414 and the fourth insulation section 432 of FIGS. 4-6 are respectively formed from a microporous silica packed powder ceramic insulation encapsulated in fiberglass fabric having a density of approximately sixteen pounds per cubic foot. The flap 412 of FIGS. 4-6 is formed from corrosion resistant steel. The seal 434 of FIGS. 4-6 is formed from fiber-reinforced silicone.

In other examples, the first hot side face sheet 406, the second hot side face sheet 428, the first cold side face sheet 408, the second cold side face sheet 428, the first insulation section 410, the second insulation section 414, the third insulation section 430, the fourth insulation section 432, the flap 412, and/or the seal 434 may be formed of material(s) differing from those identified above. For example, any of the first hot side face sheet 406, the second hot side face sheet 428, the first cold side face sheet 408, and/or the second cold side face sheet 428 may be formed of polyimide, fiberglass reinforced silicone, ceramic reinforced silicone, steel, titanium, and/or nickel. As another example, any of the first insulation section 410, the second insulation section 414, the third insulation section 430, and/or the fourth insulation section 432 may be formed of filament reinforced pyrogenic silica, fiberglass, silica, ceramic fibers, aerogel, mineral wool, cellulose, polyurethane, and/or polystyrene. As another example, the seal 434 may be formed of open cell silicone foam, partially closed cell silicone foam rubber, and/or closed cell silicone rubber, with or without a cover made of reinforced or unreinforced rubber such as silicone, polyurethane, polythioether, polysulfide, nitrile, ethylene propylene, or other rubber.

From the foregoing, it will be appreciated that the disclosed thermal protection systems and/or thermal insulators advantageously include cold side flap seals having a flap located adjacent (e.g., abutting and/or contacting) the cold side of the thermal insulator, and a seal to be compressed against the flap and laterally offset from a fastening mechanism of the thermal insulator. Locating and/or positioning the thermal seal adjacent the cold side flap of the thermal insulator advantageously reduces (e.g., minimizes) the possibility of the thermal seal being exposed to undesirably high temperatures, and causes the thermal seal to assume the cold side temperature of the thermal insulator. As a result, the thermal seal ages less quickly, and is less susceptible to experiencing a loss of durability over the life of the aircraft. The thermal seal is accordingly more likely to reach its full sealing potential and intended lifespan. Furthermore, laterally offsetting the thermal seal relative to the fastening mechanism of the thermal insulator advantageously reduces (e.g., minimizes or eliminates) any risk of losing preload applied to the fastening mechanism, and accordingly reduces any possibility that hot air will leak past the thermal seal and effect the structure that is to be protected by the thermal protection system and/or thermal insulator.

In some examples, a thermal insulator is disclosed. In some disclosed examples, the thermal insulator comprises a first thermal blanket and a second thermal blanket to be coupled to the first thermal blanket. In some disclosed examples, the first thermal blanket includes a first insulation section, a flap, and a second insulation section. In some disclosed examples, the flap extends laterally from the first insulation section and has a first portion laterally adjacent the first insulation section and a second portion laterally adjacent the first portion. In some disclosed examples, the second insulation section is located on the first portion of the flap. In some disclosed examples, the second thermal blanket includes a third insulation section, a fourth insulation section, and a seal. In some disclosed examples, the fourth insulation section has a third portion laterally adjacent the third insulation section and a fourth portion laterally adjacent the third portion. In some disclosed examples, the seal is to be compressed between the third portion of the fourth insulation section and the second portion of the flap when the second thermal blanket is coupled to the first thermal blanket.

In some disclosed examples, the first thermal blanket further includes a first hot side face sheet and a first cold side face sheet. In some disclosed examples, the second thermal blanket further includes a second hot side face sheet and a second cold side face sheet. In some disclosed examples, the first insulation section, the second insulation section and the flap are located between the first hot side face sheet and the first cold side face sheet. In some disclosed examples, the third insulation section and the fourth insulation section are located between the second hot side face sheet and the second cold side face sheet. In some disclosed examples, the flap is adjacent the first cold side face sheet. In some disclosed examples, the seal is coupled to the second cold side face sheet.

In some disclosed examples, the first thermal blanket further includes a fastener having a free end and a fixed end opposite the free end. In some disclosed examples, the free end extends from the second insulation section in a direction away from the flap. In some disclosed examples, the fixed end of the fastener is coupled to a hot side face sheet of the first thermal blanket. In some disclosed examples, the fixed end of the fastener is coupled to a cold side face sheet of the first thermal blanket. In some disclosed examples, the fastener passes through the first portion of the flap and through the second insulation section. In some disclosed examples, the second thermal blanket further includes a through hole formed in the fourth portion of the fourth insulation section. In some disclosed examples, the through hole is to receive the free end of the fastener. In some disclosed examples, the thermal insulator further comprises a retaining nut to be placed over the free end of the fastener to couple the second thermal blanket to the first thermal blanket.

In some disclosed examples, the first insulation section has a first thickness, the second insulation section has a second thickness less than the first thickness, the flap has a third thickness less than the second thickness, the third insulation section has a fourth thickness approximately equal to the first thickness, and the fourth insulation section has a fifth thickness less than the fourth thickness. In some disclosed examples, the second thickness is approximately one-third of the first thickness, and the fifth thickness is approximately two-thirds of the fourth thickness. In some disclosed examples, the first thickness is approximately 0.375 inches, the second thickness is approximately 0.125 inches, the third thickness is approximately 0.020 inches, the fourth thickness is approximately 0.375 inches, and the fifth thickness is approximately 0.250 inches. In some disclosed examples, the seal has a compressed thickness when the second thermal blanket is coupled to the first thermal blanket. In some disclosed examples, the compressed thickness of the seal is approximately equal to the second thickness of the second insulation section.

In some disclosed examples, a thermal insulator comprises a first thermal blanket and a second thermal blanket to be coupled to the first thermal blanket. In some disclosed examples, the first thermal blanket includes a first hot side face sheet, a first cold side face sheet, a first insulation section, a flap, and a second insulation section. In some disclosed examples, the first insulation section is located between the first hot side face sheet and the first cold side face sheet. In some disclosed examples, the flap is located between the first hot side face sheet and the first cold side face sheet adjacent the first cold side face sheet. In some disclosed examples, the flap extends laterally from the first insulation section and has a first portion laterally adjacent the first insulation section and a second portion laterally adjacent the first portion. In some disclosed examples, the second insulation section is located between the first hot side face sheet and the first cold side face sheet on the first portion of the flap. In some disclosed examples, the second thermal blanket includes a second hot side face sheet, a second cold side face sheet, a third insulation section, a fourth insulation section, and a seal. In some disclosed examples, the third insulation section is located between the second hot side face sheet and the second cold side face sheet. In some disclosed examples, the fourth insulation section is located between the second hot side face sheet and the second cold side face sheet. In some disclosed examples, the fourth insulation section has a third portion laterally adjacent the third insulation section and a fourth portion laterally adjacent the third portion. In some disclosed examples, the seal is coupled to the second cold side face sheet and located on the third portion of the fourth insulation section. In some disclosed examples, the seal is to be compressed between the third portion of the fourth insulation section and the second portion of the flap when the second thermal blanket is coupled to the first thermal blanket.

In some disclosed examples, the first thermal blanket further includes a fastener having a free end and a fixed end opposite the free end. In some disclosed examples, the free end extends from the second insulation section in a direction away from the flap. In some disclosed examples, the fixed end of the fastener is coupled to the first hot side face sheet of the first thermal blanket. In some disclosed examples, the fixed end of the fastener is coupled to the first cold side face sheet of the first thermal blanket. In some disclosed examples, the fastener passes through the first portion of the flap and through the second insulation section. In some disclosed examples, the second thermal blanket further includes a through hole formed in the fourth portion of the fourth insulation section. In some disclosed examples, the through hole is to receive the free end of the fastener. In some disclosed examples, the thermal insulator further comprises a retaining nut to be placed over the free end of the fastener to couple the second thermal blanket to the first thermal blanket.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A thermal insulator, comprising:
  a first thermal blanket including:
    a first insulation section;

a flap adjacent to and extending laterally from the first insulation section, the flap having a first portion laterally adjacent the first insulation section and a second portion laterally adjacent the first portion;

a second insulation section located on the first portion of the flap; and a fastener having a free end and a fixed end opposite the free end, the free end extending from the second insulation section in a direction away from the flap;

a second thermal blanket to be coupled to the first thermal blanket, the second thermal blanket including:

a third insulation section;

a fourth insulation section having a third portion laterally adjacent the third insulation section and a fourth portion laterally adjacent the third portion, the fourth portion including a through hole to receive the free end of the fastener; and a seal to be compressed between the third portion of the fourth insulation section and the second portion of the flap when the second thermal blanket is coupled to the first thermal blanket, the seal being laterally offset from the fastener such that the fastener does not pass through the seal when the seal is compressed between the third portion of the fourth insulation section and the second portion of the flap; and a retaining nut to be placed over the free end of the fastener to couple the second thermal blanket to the first thermal blanket.

2. The thermal insulator of claim 1, wherein the first thermal blanket further includes a first hot side face sheet and a first cold side face sheet, and wherein the second thermal blanket further includes a second hot side face sheet and a second cold side face sheet.

3. The thermal insulator of claim 2, wherein the first insulation section, the second insulation section and the flap are located between the first hot side face sheet and the first cold side face sheet, and wherein the third insulation section and the fourth insulation section are located between the second hot side face sheet and the second cold side face sheet.

4. The thermal insulator of claim 3, wherein the flap is adjacent the first cold side face sheet.

5. The thermal insulator of claim 3, wherein the seal is coupled to the second cold side face sheet.

6. The thermal insulator of claim 1, wherein the fixed end of the fastener is coupled to the first hot side face sheet of the first thermal blanket.

7. The thermal insulator of claim 1, wherein the fixed end of the fastener is coupled to the first cold side face sheet of the first thermal blanket, the fastener passing through the first portion of the flap and through the second insulation section.

8. The thermal insulator of claim 1, wherein the flap is formed from corrosion-resistant metal.

9. The thermal insulator of claim 1, wherein the first insulation section has a first thickness, the second insulation section has a second thickness less than the first thickness, the flap has a third thickness less than the second thickness, the third insulation section has a fourth thickness approximately equal to the first thickness, and the fourth insulation section has a fifth thickness less than the fourth thickness.

10. The thermal insulator of claim 9, wherein the second thickness is approximately one-third of the first thickness, and the fifth thickness is approximately two-thirds of the fourth thickness.

11. The thermal insulator of claim 9, wherein the seal has a compressed thickness when the second thermal blanket is coupled to the first thermal blanket, the compressed thickness being approximately equal to the second thickness of the second insulation section.

12. A thermal insulator, comprising:

a first thermal blanket including:

a first insulation section;

a flap extending laterally from the first insulation section, the flap having a first portion laterally adjacent the first insulation section and a second portion laterally adjacent the first portion; and a second insulation section located on the first portion of the flap; and a second thermal blanket to be coupled to the first thermal blanket, the second thermal blanket including:

a third insulation section;

a fourth insulation section having a third portion laterally adjacent the third insulation section and a fourth portion laterally adjacent the third portion; and a seal to be compressed between the third portion of the fourth insulation section and the second portion of the flap when the second thermal blanket is coupled to the first thermal blanket;

wherein the first insulation section has a first thickness, the second insulation section has a second thickness less than the first thickness, the flap has a third thickness less than the second thickness, the third insulation section has a fourth thickness approximately equal to the first thickness, and the fourth insulation section has a fifth thickness less than the fourth thickness.

13. The thermal insulator of claim 12, wherein the second thickness is approximately one-third of the first thickness, and the fifth thickness is approximately two-thirds of the fourth thickness.

14. The thermal insulator of claim 12, wherein the first thickness is approximately 0.375 inches, the second thickness is approximately 0.125 inches, the third thickness is approximately 0.020 inches, the fourth thickness is approximately 0.375 inches, and the fifth thickness is approximately 0.250 inches.

15. The thermal insulator of claim 12, wherein the seal has a compressed thickness when the second thermal blanket is coupled to the first thermal blanket, the compressed thickness being approximately equal to the second thickness of the second insulation section.

16. The thermal insulator of claim 12, wherein the flap is formed from corrosion-resistant metal.

17. A thermal insulator, comprising:

a first thermal blanket including:

a first hot side face sheet;

a first cold side face sheet;

a first insulation section located between the first hot side face sheet and the first cold side face sheet;

a flap located between the first hot side face sheet and the first cold side face sheet adjacent the first cold side face sheet, the flap adjacent to and extending laterally from the first insulation section, the flap having a first portion laterally adjacent the first insulation section and a second portion laterally adjacent the first portion;

a second insulation section located between the first hot side face sheet and the first cold side face sheet on the first portion of the flap; and a fastener having a free end and a fixed end opposite the free end, the free end extending from the second insulation section in a direction away from the flap;

a second thermal blanket to be coupled to the first thermal blanket, the second thermal blanket including:
a second hot side face sheet;
a second cold side face sheet;
a third insulation section located between the second hot side face sheet and the second cold side face sheet;
a fourth insulation section located between the second hot side face sheet and the second cold side face sheet, the fourth insulation section having a third portion laterally adjacent the third insulation section and a fourth portion laterally adjacent the third portion, the fourth portion including a through hole to receive the free end of the fastener; and
a seal coupled to the second cold side face sheet and located on the third portion of the fourth insulation section, the seal to be compressed between the third portion of the fourth insulation section and the second portion of the flap when the second thermal blanket is coupled to the first thermal blanket, the seal being laterally offset from the fastener such that the fastener does not pass through the seal when the seal is compressed between the third portion of the fourth insulation section and the second portion of the flap; and
a retaining nut to be placed over the free end of the fastener to couple the second thermal blanket to the first thermal blanket.

18. The thermal insulator of claim 17, wherein the fixed end of the fastener is coupled to the first hot side face sheet of the first thermal blanket.

19. The thermal insulator of claim 17, wherein the fixed end of the fastener is coupled to the first cold side face sheet of the first thermal blanket, the fastener passing through the first portion of the flap and through the second insulation section.

20. The thermal insulator of claim 17, wherein the flap is formed from corrosion-resistant metal.

* * * * *